US007634364B2

(12) United States Patent
Chen et al.

(10) Patent No.: US 7,634,364 B2
(45) Date of Patent: Dec. 15, 2009

(54) METHODS AND SYSTEMS FOR MASS DEFECT FILTERING OF MASS SPECTROMETRY DATA

(75) Inventors: Xunming Chen, Bedford, MA (US); Philip J. Savickas, Franklin, MA (US); Marvin L. Vestal, Framingham, MA (US)

(73) Assignees: Life Technologies Corporation, Carlsbad, CA (US); MDS Inc., Concord, Ontario (CA)

( * ) Notice: Subject to any disclaimer, the term of this patent is extended or adjusted under 35 U.S.C. 154(b) by 80 days.

(21) Appl. No.: 11/474,128

(22) Filed: Jun. 23, 2006

(65) Prior Publication Data

US 2007/0038387 A1 Feb. 15, 2007

Related U.S. Application Data

(60) Provisional application No. 60/694,127, filed on Jun. 23, 2005.

(51) Int. Cl.
*G01N 31/00* (2006.01)
*G06F 17/18* (2006.01)

(52) U.S. Cl. ......................... 702/23; 702/179; 702/180; 702/190

(58) Field of Classification Search .................. 702/23, 702/181–183, 179, 180, 184–190; 356/73, 356/301, 419, 401, 402
See application file for complete search history.

(56) References Cited

U.S. PATENT DOCUMENTS

2007/0278395 A1* 12/2007 Gorenstein et al. .......... 250/282

* cited by examiner

*Primary Examiner*—Edward Raymond
*Assistant Examiner*—Phuong Huynh
(74) *Attorney, Agent, or Firm*—Kasha Law LLC; John R. Kasha

(57) ABSTRACT

The present teachings relate to a method of filtering mass spectrometer data using a variable filter window. The width of the window can depend on the mass itself and the mass defects for a family of compounds. The teachings can be used with a plurality of compounds including but not limited to peptides and can be utilized on a brood range of mass spectrometers.

20 Claims, 4 Drawing Sheets

METHODS AND SYSTEMS FOR MASS DEFECT FILTERING OF MASS SPECTROMETRY DATA

FIELD

The present teachings relate to the field of mass spectrometry.

BACKGROUND

Mass defect information can be used to filter mass spectrometer data. However, most such methods typically use a mass defect based filtering window that does not scale with ion mass and/or does not include a statistical confidence performance measure. In such cases, the selected mass defect window is generally only optimal for a limited mass range. Various embodiments of the present teachings provide a statistical confidence value associated with the mass defect window selected and filter the data such that the window appropriately scales with the mass of the compound.

DESCRIPTION

Figure 1:
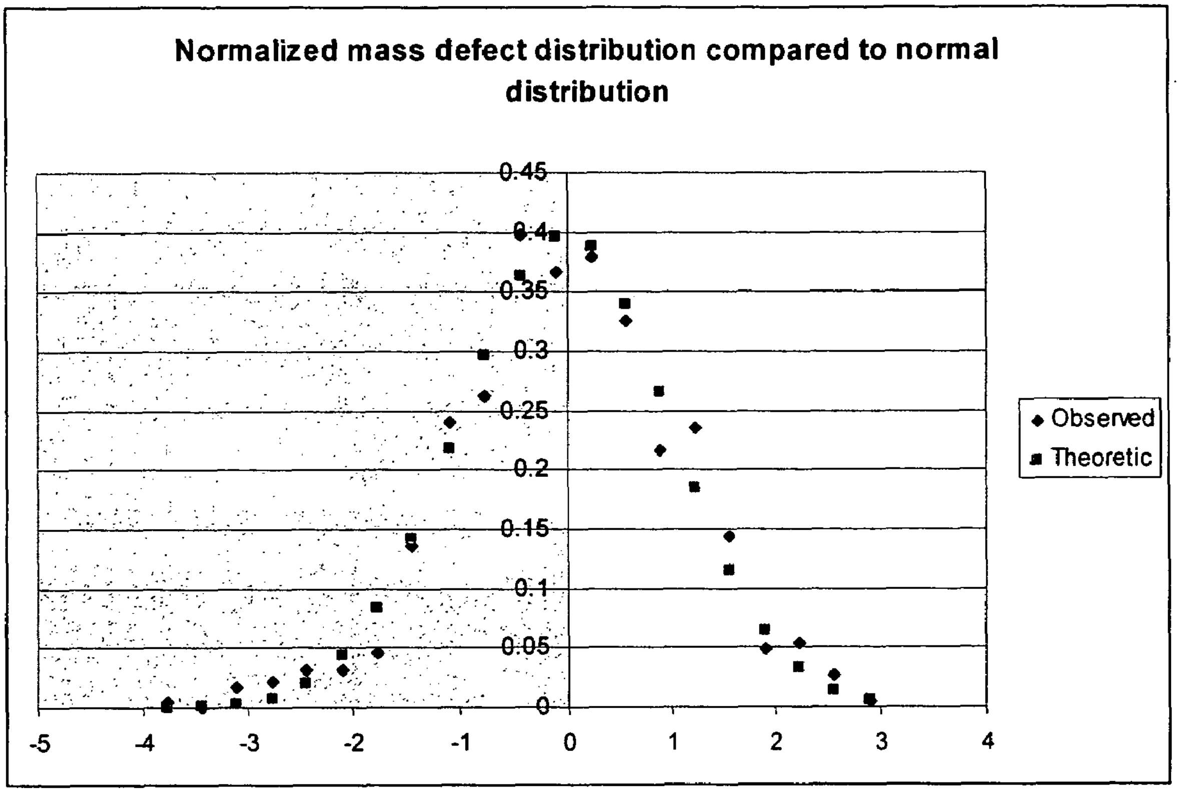
FIG. 1: Normalized mass defect distribution from 663 tryptic peptides compared to the normal distribution.

Different elements and isotopes have different nuclear binding energy. This typically results in an atomic mass shift away from their nominal mass. This mass difference is called the mass defect. A chemical compound will have a mass defect that is the sum of the mass defects from all its component atoms. Different classes of molecules are made of characteristic combinations of elements, and typically different classes of molecules exhibit distinctly characteristic mass defects.

In the field of high-resolution mass spectrometry, mass defects can be used as a signature of the chemical compound. In the study of elemental compositions, the Kendrick Mass defect spectrum has been used to show the mass defects of thousands of elemental compositions as a function of their nominal masses and thus permit classification of compositions based on their mass defects. Mass defects of monoisotopic ions are routinely used in the identification of drug metabolites using LC-MS (Liquid-Chromatograph—Mass Spectrometry) and a fixed mass defect window can be used to filter out chemical noise. In MALDI-TOF (Matrix-Assisted Laser Desorption Ionization—Time of Flight) mass spectrometry based PMF (Peptide Mass Fingerprinting), peptides and matrix ions generally have a different range of mass defects, and mass defects can be used to differentiate matrix ion peaks from peptide ion peaks.

It has been observed that the mass defect of a peptide is a function of its mass and a random variable whose distribution function varies according to peptide mass. The present teachings discuss selecting a mass defect window to use in filtering in a manner appropriate to exclude as many non-peptide ions as possible, yet large enough to include most peptide ions.

Statistical Model for Peptide Mass Defects

The present teachings contemplate the use of a statistical model of mass defect distribution to perform filtering of mass spectrometer data. One skilled in the art will appreciate that there are many methods of building such a model. The model disclosed herein is presented for illustrative purposes and does not limit the present teachings specifically to that model.

A peptide is a chain of amino acids that are made of only a few elements; generally C, H, N, O and S. Each of these elements has a small mass defect except the isotope $^{12}C$ which has zero mass defect by definition. The mass defect of each element can be normalized by its nominal mass. In the typical mass spectrometer range of interest of a few hundred to a few thousand mass units, a peptide is made of hundreds or thousands of such unit masses. Statistically, the average value of a large collection of measurements generally follows a normal distribution. Considering each mass unit to be a measurement, the average value of a single mass unit in a peptide can be modeled with a normal distribution.

Building on this normal-based modeling concept, for a known mass defect $d_1$, and standard deviation $\sigma_1$ for a single mass unit, on average the corresponding values at any nominal mass N can be calculated as:

$$d_N = N d_1 \tag{1}$$

$$\sigma_N = \sqrt{N}\sigma_1 \tag{2}$$

The mass defect distribution can be described by the following normal distribution:

$$f_N(x) = \frac{1}{\sqrt{2\pi}\,\sigma_N} e^{-\frac{(x-d_N)^2}{2\sigma_N^2}} \tag{3}$$

Furthermore, the mass defect and standard deviation for a single mass unit can be estimated from peptide mass data according to the following equations:

$$d_1 = \frac{\sum_N \Delta m_N}{\sum_N N} \tag{4}$$

$$\sigma_1 = \sqrt{\frac{\sum (\Delta m_N - d_N)^2}{\sum N}} \tag{5}$$

where $\Delta m_N$ is the mass defect at nominal mass N.

The following table lists some peptide masses, their nominal masses and their mass defects.

| Mass (Da) | N (Da) | $\Delta m_N$ (Da) |
|---|---|---|
| 361.201 | 361 | 0.201 |
| 462.267 | 462 | 0.267 |
| 1026.496 | 1026 | 0.496 |
| 1043.617 | 1043 | 0.617 |
| 2093.087 | 2092 | 1.0867 |
| 2107.088 | 2106 | 1.088 |
| 3657.929 | 3656 | 1.9294 |
| 3678.949 | 3677 | 1.949 |

Enzyme Digestion Correction:

Enzymes generally cleave a protein into peptide segments at particular sites. A commonly used enzyme is trypsin which cleaves at the amino acids Lysine (K) and Arginine (R) sites resulting in what are known as tryptic peptides. For a tryptic peptide, the c-terminal residue will be generally either K or R; not a randomly chosen amino acid as is expected by the statistical model. Due to the large number of hydrogen atoms, both K and R have larger mass defects than most other amino acids. Thus the mass defect at the c-terminus will generally be higher than the average mass defect. The extra mass defect contribution from the c-terminus $D_e$, modifies equation (1) to become $$d_N = Nd_1 + D_e \quad (6)$$

and equation (4) becomes:

$$d_1 = \frac{\sum_N (\Delta m_N - D_e)}{\sum_N N} \quad (7)$$

The other equations are not affected.

To estimate $D_e$ from equation (6), knowledge of the average mass for a single mass unit, $d_1$ can be used. If the peptide mass is very large, the impact of $D_e$ on the total mass defect is relatively small. Thus equation (4) would still be valid.

EXAMPLE

Five proteins were theoretically digested according to the trypsin digestion rule. The five proteins were: Bovine Lactoperoxidase, BGAL_ECOLI Beta-galactosidase, Pig Immuno gamma globulin, Bovine Catalase and Rabbit Phosphorylase B. 25 peptides in the range of 3000-5000 Da were used for estimating the average mass defect. The average mass defect for a single mass unit is calculated to be $d_1=0.477\times10^{-3}$ Da according to equation (4).

According to equation (1), the average mass defect at mass 128 Da (the mass of K) is 0.061 Da. The actual mass defect of K is 0.095 Da. Thus the extra mass defect introduced by K is 0.034 Da. Similarly, the extra mass defect introduced by R is 0.027 Da. Thus, $D_e$ is chosen to be 0.03 Da for tryptic peptides.

Once $D_e$ is determined, equations (7), (6) and (5) can be used to calculate $d_1$ and $\sigma_1$. 310 peptides in the mass range of 300 to 5000 Da (from the same five proteins) were used for the calculation. The average mass defect and standard deviation were determined to be $d_1=0.4802\times10^{-3}$ Da and $\sigma_1=1.46\times10^{-3}$ Da.

According to equation (6) and (2), some predicted mass defects as of nominal masses are listed in the following table:

| N (Da) | $d_N$ (Da) | $\sigma_N$ (Da) |
|---|---|---|
| 100 | 0.07802 | 0.0146 |
| 200 | 0.12604 | 0.020648 |
| 500 | 0.2701 | 0.032647 |
| 750 | 0.39015 | 0.039984 |
| 1000 | 0.5102 | 0.046169 |
| 1300 | 0.65426 | 0.052641 |
| 1700 | 0.84634 | 0.060197 |
| 2100 | 1.03842 | 0.066906 |
| 2600 | 1.27852 | 0.074446 |
| 3000 | 1.4706 | 0.079967 |
| 3500 | 1.7107 | 0.086375 |

Validation of the Model:

According to the statistical model adopted in some embodiments of the present teachings, mass defects at different masses follow normal distributions with mass dependent means and standard deviations. A new variable can be defined $$y = \frac{x - d_N}{\sigma_N} \quad (8)$$

for each nominal mass N, and the mass defect distribution becomes:

$$f_N(y) = \frac{1}{\sqrt{2\pi}} e^{-\frac{y^2}{2}} \quad (9)$$

This distribution becomes independent of the nominal mass N. Thus the normalized mass defect from all peptides should follow the same distribution as described by equation (9).

To validate the model, thirteen proteins were theoretically digested according to the trypsin rule. Mass defects of all 663 peptides in the mass range of 300 to 5000 Da were normalized according to equation (8). The normalized mass defect distribution from those peptides is compared against the standard normal distribution as described by equation (9). The comparison is shown in FIG. 1. The close agreement between the observed mass defect distribution and the normal distribution shows that the normal-based statistical model for peptide mass defects provides accurate predictions. Besides the five proteins used for calculating the average mass defect, eight more proteins were digested for generating a normalized defect distribution. These proteins were: Bovine Serum Albumin, Bovine Carboxypeptidase, Chicken Conalbumin, Bacillus Alpha Amylase, Bovine Glutamic Dehydrogenase, Rabbit G3P Dehydrogenase, Horseradish Peroxidase and Bovine Carbonic Anhydrase.

Mass Defects from Modifications:

Often times, peptides undergo modifications that can change their mass. The chemical composition of modifications may not be similar to those of standard amino acids. Thus they may introduce an extra mass defect. The impact of this extra mass defect can be handled in a similar fashion to the enzyme digestion correction. The following table shows the impact of some large modifications on mass defects.

| Modification | Residue | Mass change | Predicted Mass defect (Da) | Impact on defect (Da) |
|---|---|---|---|---|
| C13(0)-ICAT | C | 227.127 | 0.109005 | 0.017995 |
| C13(9)-ICAT | C | 236.1572 | 0.113327 | 0.043873 |
| Carboxamidomethyl | C | 57.0215 | 0.027371 | −0.00587 |
| D0-ICAT | C | 442.225 | 0.212248 | 0.012752 |

-continued

| Modification | Residue | Mass change | Predicted Mass defect (Da) | Impact on defect (Da) |
|---|---|---|---|---|
| D8-ICAT | C | 450.2752 | 0.21609 | 0.05911 |
| ITRAQ114 | | 144.1059 | 0.069149 | 0.036751 |
| ITRAQ115 | | 144.0996 | 0.069149 | 0.030451 |
| ITRAQ116 | | 144.1021 | 0.069149 | 0.032951 |
| ITRAQ117 | | 144.1021 | 0.069149 | 0.032951 |

ICAT (Isotope-Coded-Affinity-Tag) and iTRAQ reagents (Isobaric Tags for Relative and Absolute Quantitation) are Applied Biosystems product for protein labeling and quantification.

When a modification is considered, there are two groups of peptides, one without modification, the other with modification. Generally, their mass defects follow the same normal distribution with different $D_e$. In many cases, the extra mass defect due to the modification is very small. For spectrum filtering purposes, one can use the assumption that that all mass defects follow the same distribution and add this extra mass defect to one side of the mass defect filtering window.

An occasion where the impact of a modification may become more significant occurs when the modification has one or more large mass defect elements such as Br, I, or Cs. The mass defect distribution for the modified peptides is still normally distributed and possesses the same standard deviation as that of the unmodified ones. In some applications, a large mass defect has been added to peptides as a mass defect tag to efficiently track the desired tagged species. The amount of defect introduced in the tagged peptide determines the amount of overlap between the two mass defect distributions (one for untagged peptides, the other for tagged), and thus determines the probability of false positive identification. In the overlapping region, the tagged and untagged peptides can not be distinguished, resulting in possible false positive identification.

Application of Mass Defect Model in Spectrum Filtering:

Low abundance proteins play very important roles in biological processes. An active research area is the detection of biomarker proteins. Very often, biomarkers are associated with low abundance proteins with mass peak intensities barely above background noise levels. Because of this and other factors, reliably identifying biomarker patterns can be very challenging. If mass spectra noise can be reduced without significantly affecting peptides peaks, the chance of identifying low abundance proteins will likely be greatly improved.

Using the normal-based mass defect distribution with mean and standard deviations described by equations (6) and (2), the mean and standard deviation of the mass defect at any mass can be computed. Some embodiments contemplate using a mass filter to exclude masses outside 2 times the standard-deviation of the mass defect. Statistically, 95.5% of peptide ions should not be affected by this filter, while all noise outside this window will be removed. Since the confidence interval for 2 sigma is 95.5% a statistical measure is imparted on the filtering process. Instead of using a fixed window size, this filter window size scales with mass according to equation (2). The size of the window, ie. the multiplier for sigma, can be set to other values as appropriate.

The present teachings contemplate a filtering algorithm based on variable window-sizes to filter MS spectra from MALDI-TOF data, although any type of mass spectrometer data can benefit from the present teachings. The algorithm computes a statistical model based on the mass defects, calculates the mass defect for a given mass and applies a filter to remove peaks outside a window that scales with the mass. This scaling can be performed by using a multiple of the standard deviation of the mass defects for a given mass.

Figure 2:
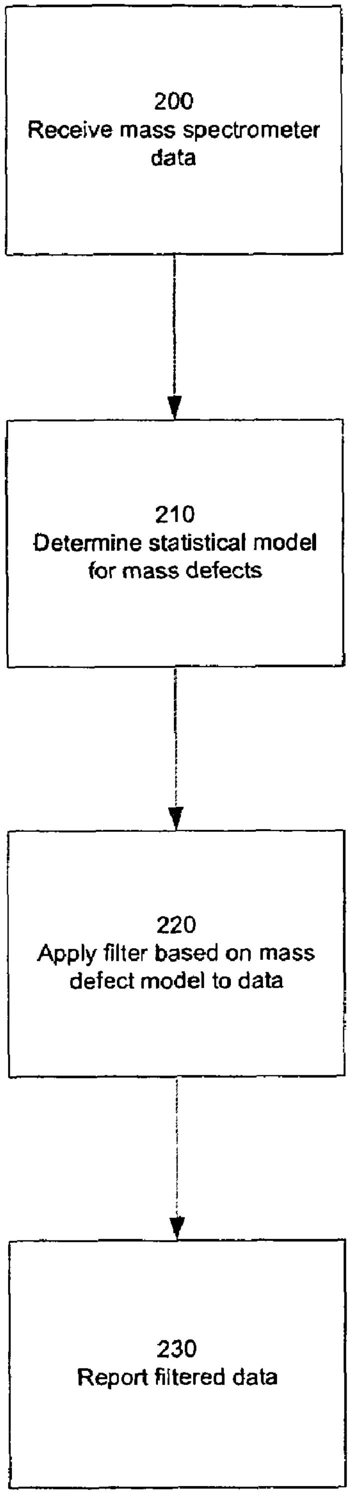
FIG. 2: Block diagram that illustrates an embodiment of the present teachings.

FIG. 2 illustrates a block diagram describing an embodiment of the present teachings. At block 210, the MS data enters the system. At block 220 a statistical model of mass defects is built. This model can be based on the embodiments described in the present teachings or as one skilled in the art will appreciate, it can be developed using alternate approaches. However, it is important that the model be able to capture information regarding how mass defects vary with mass. In various embodiments, block 220 may not be present as the model may have been computed beforehand, that is, prior to filtering wanting to filter the data at block 200. At block 230, the mass spectrometer data is filtered by applying a mass defect window whose width is scaled according to a compound's mass. Finally at block 240, the filtered results are reported to the user.

Figure 3A:
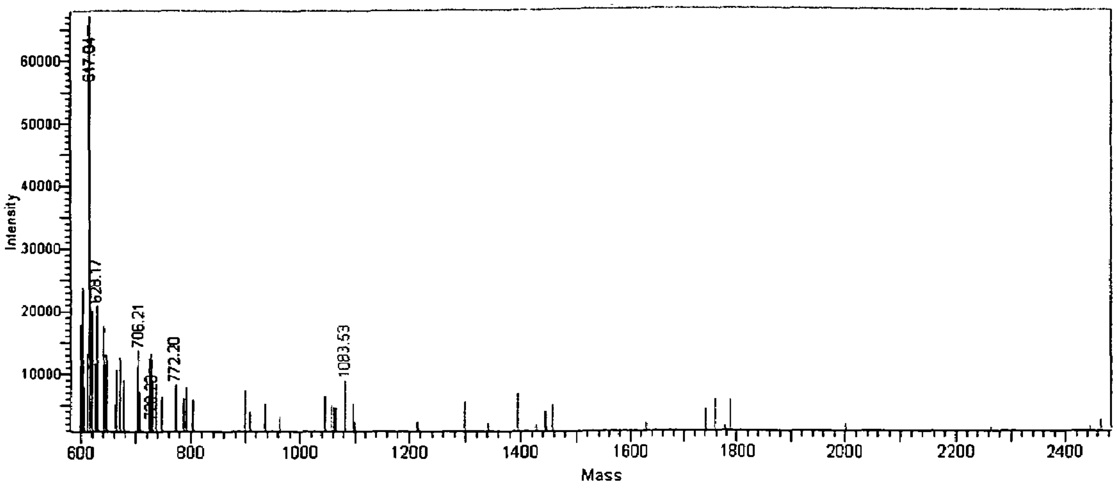
FIG. 3*a*: A spectrum from 1 fmol/uL B-gal before filtering.
Figure 3B:
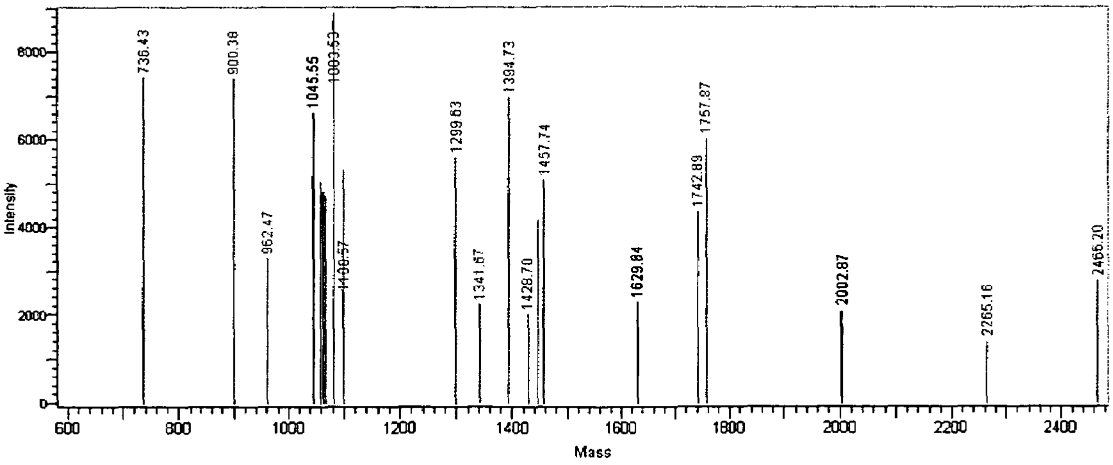
FIG. 3*b*: Spectrum from 1 fmol/uL B-gal after 2 sigma filtering.

FIGS. 3*a* and 3*b* show the comparison between spectra before and after mass defect filtering using a 2 standard deviation window. FIG. 3*a* shows the data before the application of the filter, whereas FIG. 3*b* shows the data after filtering. The sample is 1 fmol/uL beta-gal on alpha-cyano-4-hydroxy-cinnamic-acid (CHCA) matrix with matrix ion cluster suppressor (10 mM ammonium phosphate) added. Peaks in red are beta-gal peptide peaks. Peaks in black are either matrix ion peaks or chemical noise. Most of the matrix peaks and chemical noise are removed by the mass defect filter without removing any B-gal peptide peaks. The 4 remaining black peaks have mass defects similar to those of peptides that are present. The remaining peaks might be the result of sample impurities or B-gal peptides with modifications.

One skilled in the art will appreciate that the present teachings involving constructing a mass defect model and filtering MS data in a manner whereby the size of the filter window varies with mass and is based on mass defect information can also be applied to other chemical compound families such as small molecule drug metabolites. Generally, what differentiates one family of compound from another is the value of average mass defect and standard deviation. Thus, the same methodology can be applied but with parameters that depend on the types of compounds being studied.

Figure 4:
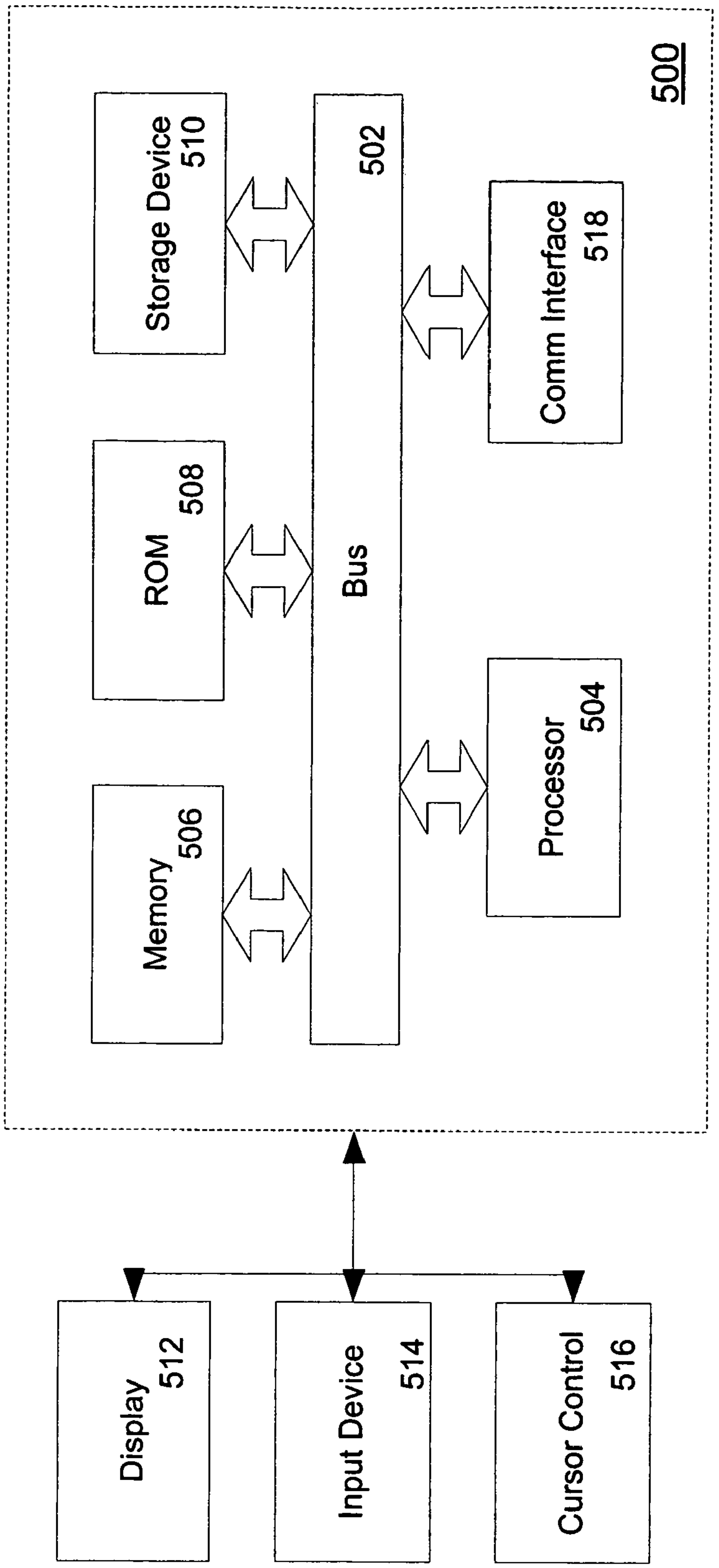
FIG. 4: Block diagram that illustrates a computer system, upon which embodiments of the present teachings may be implemented.

Computer System Implementation:

FIG. 4 is a block diagram that illustrates a computer system 500, according to certain embodiments, upon which embodiments of the present teachings may be implemented. Computer system 500 includes a bus 502 or other communication mechanism for communicating information, and a processor 504 coupled with bus 502 for processing information. Computer system 500 also includes a memory 506, which can be a random access memory (RAM) or other dynamic storage device, coupled to bus 502, and instructions to be executed by processor 504. Memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT) or liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Consistent with certain embodiments of the present teachings functions such as mass defect computation, and mass defect filtering can be performed and results displayed by computer system 500 in response to processor 504 executing one or more sequences of one or more instructions contained in memory 506. Such instructions may be read into memory 506 from another computer-readable medium, such as storage device 510. Execution of the sequences of instructions contained in memory 506 causes processor 504 to perform the process states described herein. Alternatively hard-wired circuitry may be used in place of or in combination with software instructions to implement the invention. Thus implementations of the present teachings are not limited to any specific combination of hardware circuitry and software.

The term "computer-readable medium" as used herein refers to any media that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as memory 506. Transmission media includes coaxial cables, copper wire, and fiber optics, including the wires that comprise bus 502.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, PROM, and EPROM, a FLASH-EPROM, any other memory chip or cartridge, or any other medium from which a computer can read.

Various forms of computer readable media may be involved in carrying one or more sequences of one or more instructions to processor 504 for execution. For example, the instructions may initially be carried on magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector coupled to bus 502 can receive the data carried in the infra-red signal and place the data on bus 502. Bus 502 carries the data to memory 506, from which processor 504 retrieves and executes the instructions. The instructions received by memory 506 may optionally be stored on storage device 510 either before or after execution by processor 504.

The foregoing description has been presented for purposes of illustration and description. It is not exhaustive and does not limit the invention to the precise form disclosed. Modifications and variations are possible in light of the above teachings or may be acquired from practice. Additionally, the described implementation includes software but the present teachings may be implemented as a combination of hardware and software or in hardware alone. The present teachings may be implemented with both object-oriented and non-object-oriented programming systems.

The invention claimed is:

1. A method for mass defect filtering of mass spectrometry data, comprising:

analyzing a plurality of known compounds from one or more known samples using a mass spectrometer, producing a first plurality of mass measurements for the known compounds;

obtaining the first plurality of mass measurements from the mass spectrometer using a processor;

selecting a distribution function based on a distribution of the first plurality of mass measurements using the processor;

creating a mass defect function for a mass that is a function of mass and the distribution function using the processor;

analyzing a plurality of unknown compounds from one or more unknown samples using the mass spectrometer, producing a second plurality of mass measurements for the unknown compounds;

obtaining the second plurality of mass measurements from the mass spectrometer using a processor; and filtering the second plurality of mass measurements using a filter window size that scales with mass according to the mass defect function using the processor.

2. The method of claim 1, wherein the plurality of known compounds comprises a plurality of known peptides and the plurality of unknown compounds comprises a plurality of unknown peptides.

3. The method of claim 2, wherein selecting a distribution function based on a distribution of the first plurality of mass measurements using the processor comprises selecting a normal distribution function based on a distribution of the first plurality of mass measurements using the processor.

4. The method of claim 3, wherein creating a mass defect function for a mass that is a function of mass and the distribution function using the processor comprises creating a mass defect function for a mass that is a function of mass and a mean of the normal distribution function using the processor.

5. The method of claim 4, wherein filtering the second plurality of mass measurements using a filter window size that scales with mass according to the mass defect function using the processor comprises filtering the second plurality of mass measurements using a filter window size that is within a multiple of a standard deviation of the normal distribution function using the processor.

6. The method of claim 1, wherein the plurality of known compounds comprises a plurality of known peptides digested by an enzyme and the plurality of unknown compounds comprises a plurality of unknown peptides digested by the enzyme.

7. The method of claim 6, wherein selecting a distribution function based on a distribution of the first plurality of mass measurements using the processor comprises selecting a normal distribution function based on a distribution of the first plurality of mass measurements using the processor.

8. The method of claim 7, further comprising calculating an extra mass defect contribution based on a mass defect of an amino acid where the enzyme is known to cleave peptides.

9. The method of claim 8, wherein creating a mass defect function for a mass that is a function of mass and the distribution function using the processor comprises creating a mass defect function for a mass that is a function of mass, a mean of the normal distribution function, and the extra mass defect contribution using the processor.

10. The method of claim 1, wherein the plurality of known compounds comprises a plurality of known peptides that undergo a modification and the plurality of unknown compounds comprises a plurality of unknown peptides that undergo the modification.

11. The method of claim 10, wherein selecting a distribution function based on a distribution of the first plurality of mass measurements using the processor comprises selecting a normal distribution function based on a distribution of the first plurality of mass measurements using the processor.

12. The method of claim 11, further comprising calculating an extra mass defect contribution based on the modification using the processor.

13. The method of claim 12, wherein creating a mass defect function for a mass that is a function of mass and the distribution function using the processor comprises creating a mass defect function for a mass that is a function of mass, a mean of the normal distribution function, and the extra mass defect contribution using the processor.

14. A system for mass defect filtering of mass spectrometry data, comprising:

a mass spectrometer that analyzes a plurality of known compounds from one or more known samples, producing a first plurality of mass measurements for the known compounds and analyzes a plurality of unknown compounds from one or more unknown samples, producing a second plurality of mass measurements for the known compounds; and a processor in communication with the mass spectrometer that obtains the first plurality of mass measurements from the mass spectrometer, selects a distribution function based on a distribution of the first plurality of mass measurements, creates a mass defect function for a mass that is a function of mass and the distribution function, obtains the second plurality of mass measurements from the mass spectrometer, and filters the second plurality of mass measurements using a filter window size that scales with mass according to the mass defect function.

15. The system of claim 14, wherein the plurality of known compounds comprises a plurality of known peptides and the plurality of unknown compounds comprises a plurality of unknown peptides.

16. The system of claim 15, wherein the processor selects a normal distribution function based on a distribution of the first plurality of mass measurements.

17. The system of claim 16, wherein the processor creates a mass defect function for a mass that is a function of mass and a mean of the normal distribution function.

18. The system of claim 17, wherein the processor filters the second plurality of mass measurements using a filter window size that is within a multiple of a standard deviation of the normal distribution function.

19. A computer program product, comprising a tangible computer-readable storage medium whose contents include a program with instructions being executed on a processor so as to perform a method for mass defect filtering of mass spectrometry data, the method comprising:

providing a system, wherein the system comprises distinct software modules, and wherein the distinct software modules comprise a receiving mass spectrometer data module, a determining a statistical model for mass defects module, and an applying a filter based on the mass defect model to the data module;

obtaining a first plurality of mass measurements produced from a plurality of known compounds from one or more known samples by a mass spectrometer using the receiving mass spectrometer data module;

selecting a distribution function based on a distribution of the first plurality of mass measurements using the determining a statistical model for mass defects module;

creating a mass defect function for a mass that is a function of mass and the distribution function using the determining a statistical model for mass defects module;

obtaining a second plurality of mass measurements produced from a plurality of unknown compounds from one or more unknown samples by the mass spectrometer using the receiving mass spectrometer data module; and filtering the second plurality of mass measurements using a filter window size that scales with mass according to the mass defect function using the applying a filter based on the mass defect model to the data module.

20. The computer program product of claim 19, wherein the plurality of known compounds comprises a plurality of known peptides and the plurality of unknown compounds comprises a plurality of unknown peptides.

* * * * *